United States Patent
Zander et al.

(10) Patent No.: US 11,368,200 B2
(45) Date of Patent: Jun. 21, 2022

(54) DYNAMIC CONTROL OF BEAM CORRESPONDENCE

(71) Applicant: Sony Corporation, Tokyo (JP)

(72) Inventors: Olof Zander, Lund (SE); Kun Zhao, Malmö (SE); Fredrik Rusek, Esloev (SE); Erik Bengtsson, Lund (SE); Thomas Bolin, Lund (SE); Torgny Palenius, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/266,398

(22) PCT Filed: Aug. 31, 2019

(86) PCT No.: PCT/US2019/049241
§ 371 (c)(1),
(2) Date: Feb. 5, 2021

(87) PCT Pub. No.: WO2020/068376
PCT Pub. Date: Apr. 2, 2020

(65) Prior Publication Data
US 2021/0314040 A1    Oct. 7, 2021

Related U.S. Application Data

(60) Provisional application No. 62/738,334, filed on Sep. 28, 2018.

(51) Int. Cl.
*H04B 7/06* (2006.01)
*H04W 24/08* (2009.01)
(Continued)

(52) U.S. Cl.
CPC .......... *H04B 7/0617* (2013.01); *H04W 24/08* (2013.01); *H04W 52/0261* (2013.01); *H04W 72/046* (2013.01); *H04W 72/048* (2013.01)

(58) Field of Classification Search
CPC .... H04B 7/0617; H04B 7/0695; H04B 7/088; H04W 24/08; H04W 52/0261; H04W 72/046; H04W 72/048
See application file for complete search history.

(56) References Cited

U.S. PATENT DOCUMENTS

2010/0091675 A1* 4/2010 Sawai ............... H04L 25/03343
370/252
2018/0227898 A1* 8/2018 Noh ........................ H04B 7/088
(Continued)

FOREIGN PATENT DOCUMENTS

JP          2020509664 A    3/2020
WO       2018/144844 A1    8/2018

OTHER PUBLICATIONS

International Search Report and Written Opinion from corresponding International Application No. PCT/US2019/049241, dated Feb. 12, 2020, 14 pages.
(Continued)

*Primary Examiner* — Kenneth T Lam
(74) *Attorney, Agent, or Firm* — Tucker Ellis LLP

(57) ABSTRACT

A wireless communication device includes a wireless interface for conducting wireless communications with a network access node of a wireless network, the wireless interface having uplink and downlink beam forming capabilities. The wireless communication device further includes a control circuit configured to detect a predetermined condition and, in response to the detection, temporarily operate the wireless interface without beam correspondence between uplink and downlink operations; and transmit a message to the network access node that beam correspondence is not used by the wireless communication device.

20 Claims, 2 Drawing Sheets

(51) Int. Cl.
*H04W 52/02* (2009.01)
*H04W 72/04* (2009.01)

(56) References Cited

U.S. PATENT DOCUMENTS

2018/0234959 A1*  8/2018  Ahn .................... H04W 72/042
2019/0159135 A1*  5/2019  MolavianJazi ..... H04W 52/362
2020/0136708 A1*  4/2020  Pan ...................... H04L 5/0051

OTHER PUBLICATIONS

Sony, "On UE Beam Correspondence", 3GPP TSG-RAN WG4 Meeting #87, R4-1807809, May 21-25, 2018, 3 pages.

\* cited by examiner

DYNAMIC CONTROL OF BEAM CORRESPONDENCE

RELATED APPLICATION DATA

This application claims the benefit of U.S. Patent Application No. 62/738,334, filed Sep. 28, 2018, the disclosure of which is incorporated herein by reference in its entirety.

TECHNICAL FIELD OF THE INVENTION

The technology of the present disclosure relates generally to operation of a wireless communication device in a wireless network and, more particularly, to a system and method for dynamically controlling the use of beam correspondence (BC).

BACKGROUND

Beam correspondence (BC) is a concept under the consideration of the Third Generation Partnership Project (3GPP) 5G for future potential versions of the specification of new radio (NR), also referred to as "Release-16." BC is not yet fully defined for 5G-compliant radios, but is broadly thought of as a feature that will significantly simplify the antenna beam search procedure at a transmit(Tx)/Receive (Rx) Point (TRP). For this reason, proposals have been made to make BC mandatory. Current 3GPP specifications allow for optional use of BC by a UE. If BC is applied by the UE, the UE will signal the serving base station.

BC is a feature that, depending on its definition, requires a user equipment (UE) to have the same antenna pattern in up-link (UL) as in down-link (DL). A general definition for BC is found in RAN1 #86 bis, "Final Report of 3GPP TSG RAN WG1 #86bis" v1.0.0 (Lisbon, Portugal, 10-14 Oct. 2016) as follows:

The followings are defined as Tx/Rx beam correspondence at TRP and UE:
- Tx/Rx beam correspondence at TRP holds if at least one of the following is satisfied:
  - TRP is able to determine a TRP Rx beam for the uplink reception based on UE's downlink measurement on TRP's one or more Tx beams.
  - TRP is able to determine a TRP Tx beam for the downlink transmission based on TRP's uplink measurement on TRP's one or more Rx beams
- Tx/Rx beam correspondence at UE holds if at least one of the following is satisfied:
  - UE is able to determine a UE Tx beam for the uplink transmission based on UE's downlink measurement on UE's one or more Rx beams.
  - UE is able to determine a UE Rx beam for the downlink reception based on TRP's indication based on uplink measurement on UE's one or more Tx beams.

Beam correspondence may be based on a UE's downlink measurement on one or more of the UE's Rx beams. This has prompted the consideration of additional definitional components of BC. For example, a UE may need to be able to determine its Tx beam for the uplink transmission based on the UE's downlink measurement on the UE's one or more Rx beams (referred to as possible definition A). From this, the UE may need to be able to find its best Tx beam (referred to as possible definition B). As such, there should be no better beam than the chosen beam, within a defined tolerance. Further, the UE may need to be able to respond with the best polarization (referred to as possible definition C). Lastly, gain relation between UE Rx beam and UE TX beam may need to be constant over the sphere (referred to as possible definition D).

Thus far, the reference architecture for BC that has been discussed in 3GPP is a mobile handheld UE (e.g., a smartphone). For this type of UE, it is typical that similar antennas and RF paths are used for reception and transmission. Therefore, beam correspondence according to possible definitions A and B are possible. But possible definition C would require the UE to have control of the polarization in both the downlink (DL) and the uplink (UL). Also, BC according to possible definition D impacts the power control algorithm.

SUMMARY

Proposed are control operations and signaling for dynamically turning BC on and off by the UE. Therefore, if the UE has a declared beam correspondence feature, the UE shall have the possibility to set the beam correspondence temporarily off for one or more reasons as discussed in greater detail below.

According to one aspect of the disclosure, a wireless communication device includes a wireless interface for conducting wireless communications with a network access node of a wireless network, the wireless interface having uplink and downlink beam forming capabilities; and a control circuit configured to: detect a predetermined condition and, in response to the detection, temporarily operate the wireless interface without beam correspondence between uplink and downlink operations; and transmit a message to the network access node that beam correspondence is not used by the wireless communication device.

According to another aspect of the disclosure, a method of conducting wireless communications in a wireless network includes operating a wireless interface having uplink and downlink beam forming capabilities of a wireless communication device with beam correspondence; detecting presence of a predetermined condition and, in response to the detecting, temporarily operating the wireless interface without beam correspondence between uplink and downlink operations; and transmitting a message to a network access node of the wireless network that beam correspondence is not used by the wireless communication device According to another aspect of the disclosure, a network access node of a wireless network includes a transmit/receive point (TRP) having uplink and downlink beam forming capabilities relative to a wireless communication device; and a control circuit configured to control operation of the TRP, including: receive a message from the wireless communication device that beam correspondence is not used by the wireless communication device; and independently apply a first beam management process for the uplink with the wireless communication device and a second beam management process for the downlink with the wireless communication device.

According to another aspect of the disclosure, a method of conducting wireless communications in a wireless network including operating a transmit/receive point (TRP) of a network access node, the TRP having uplink and downlink beam forming capabilities relative to a wireless communication device, the operating carried out in accordance with beam correspondence for the wireless communication device; receiving a message from the wireless communication device that beam correspondence is not used by the wireless communication device; and in response to the message, independently applying a first beam management process for the uplink with the wireless communication device and a second beam management process for the downlink with the wireless communication device.

DETAILED DESCRIPTION OF EMBODIMENTS

Figure 1:
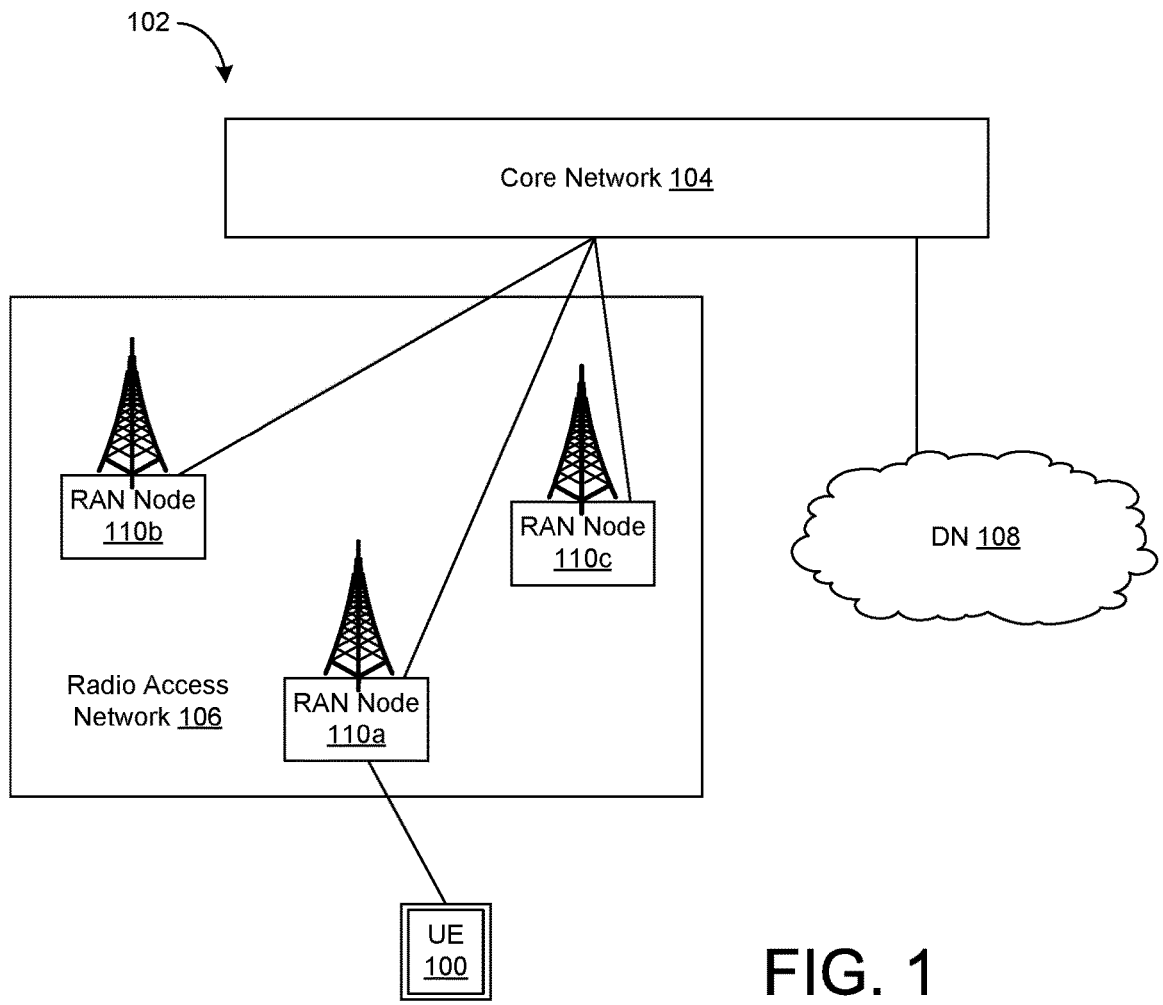
FIG. 1 is a schematic block diagram of a representative operational network environment for a radio communication device, also referred to as a user equipment.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

System Architecture

FIG. 1 is a schematic diagram of an exemplary network environment in which the disclosed techniques are implemented. It will be appreciated that the illustrated network environment is representative and other environments or systems may be used to implement the disclosed techniques. Also, various network functions may be carried out by a single device, such as by a radio access node, or may be carried out in a distributed manner across nodes of a computing environment.

The network environment is relative to an electronic device, such a user equipment (UE) 100. As contemplated by 3GPP standards, the UE may be a mobile radiotelephone (a "smartphone"). Other exemplary types of UEs 100 include, but are not limited to, a gaming device, a media player, a tablet computing device, a computer, a camera, and an internet of things (IoT) device. Since aspects of the disclosed techniques may be applicable to non-3GPP networks, the UE 100 may be more generically referred to as a wireless communications device or a radio communication device.

The network environment includes a wireless communication network 102 that may be configured in accordance with one or more 3GPP standards, such as a 3G network, a 4G network or a 5G network. The disclosed approaches may apply to other types of networks. In one embodiment, standards that govern operation of the wireless communication network 102 may mandate that UEs 100 that operate in the network employ beam correspondence (BC).

In instances where the network 102 is a 3GPP network, the network 102 includes a core network (CN) 104 and a radio access network (RAN) 106. The core network 104 provides an interface to a data network (DN) 108. The DN 108 represents operator services, connection to the Internet, third party services, etc. Details of the core network 104 are omitted for simplicity of description, but it is understood that the core network 104 includes one or more servers that host a variety of network management functions, examples of which include, but are not limited to, a user plane function (UPF), a session management function (SMF), a core access and mobility management function (AMF), an authentication server function (AUSF), a network exposure function (NEF), a network repository function (NRF), a policy control function (PCF), a unified data management (UDM), an application function (AF), and a network slice selection function (NSSF).

The RAN 106 includes a plurality of RAN nodes 110. In the illustrated example, there are three RAN nodes 110a, 110b, and 110c. Fewer than or more than three RAN nodes 110 may be present. For 3GPP networks, each RAN node 110 may be a base station such as an evolved node B (eNB) base station or a 5G generation gNB base station. The RAN node 110 may include one or more than one Tx/Rx point (TRP). Since aspects of the disclosed techniques may be applicable to non-3GPP networks, the RAN nodes 110 may be more generically referred to as network access nodes, an alternative example of which is a WiFi access point.

A radio link may be established between the UE 100 and one of the RAN nodes 110 for providing wireless radio services to the UE 100. The RAN node 110 to which the radio link is established will be referred to as the servicing RAN node 110 or servicing base station. Other RAN nodes 110 may be within communication range of the UE 100. The RAN 106 is considered to have a user plane and a control plane. The control plane is implemented with radio resource control (RRC) signaling between the UE 100 and the RAN node 110. Another control plane between the UE 100 and the core network 104 may be present and implemented with non-access stratum (NAS) signaling.

Figure 2:
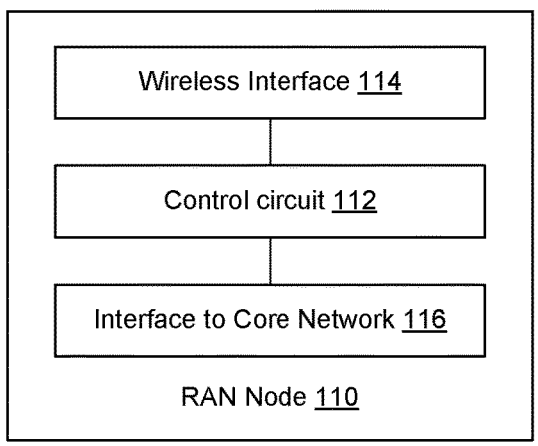
FIG. 2 is a schematic block diagram of a RAN node from the network environment.

With additional reference to FIG. 2, each RAN node 110 typically includes a control circuit 112 that is responsible for overall operation of the RAN node 110, including controlling the RAN node 110 to carry out the operations described in herein. In an exemplary embodiment, the control circuit may include a processor (e.g., a central processing unit (CPU), microcontroller, or microprocessor) that executes logical instructions (e.g., lines or code, software, etc.) that are stored by a memory (e.g., a non-transitory computer readable medium) of the control circuit 112 in order to carry out operation of the RAN node 110.

The RAN node 110 also includes a wireless interface 114 for establishing an over the air connection with the UE 100. The wireless interface 114 may include one or more radio transceivers and antenna assemblies to form the TRP(s). The RAN node 110 also includes an interface 116 to the core network 104. The RAN node 110 also includes an interface (not shown) to one or more neighboring RAN nodes 110 for conducting network coordination in the RAN 106.

Figure 3:
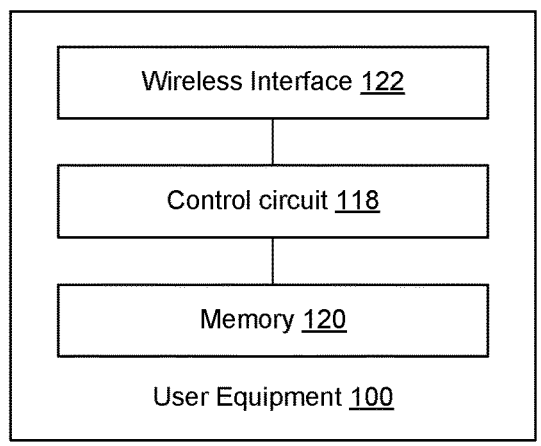
FIG. 3 is a schematic block diagram of the user equipment from the network environment.

With additional reference to FIG. 3, illustrated is a schematic block diagram of the UE 100. The UE 100 includes a control circuit 118 that is responsible for overall operation of the UE 100, including controlling the UE 100 to carry out the operations described herein. In an exemplary embodiment, the control circuit 118 may include a processor (e.g., a central processing unit (CPU), microcontroller, or microprocessor) that executes logical instructions (e.g., lines or code, software, etc.) that are stored by a memory (e.g., a non-transitory computer readable medium) of the control circuit 118 or a separate memory 120 in order to carry out operation of the UE 100.

The UE 100 includes a wireless interface 122, such as a radio transceiver and antenna assembly, for establishing an over the air connection with the servicing base station 110. In some instances, the UE 100 may be powered by a rechargeable battery (not shown). Depending on the type of device, the UE 100 may include one or more other components. Other components may include, but are not limited to, sensors, displays, input components, output components, electrical connectors, etc.

Dynamic Control of Beam Correspondence

Techniques will be described for controlling beam correspondence employed by the UE 100. There are a variety of situations where the use by beam correspondence by the UE 100 may not be desirable. Accordingly, proposed is the ability for the UE 100 to "turn off" BC when a triggering situation is detected and "turn on" BC when the situation is no longer present.

For instance, in communications that admit duplex traffic, there are some scenarios where there is very limited or no communication in one of the directions (e.g., the uplink or the downlink) and relatively large amount of data flow in the other of the directions. For instance, a surveillance camera may have high uplink usage and very low downlink usage. In contrast, a UE 100 that is involved in media consumption may have high downlink usage for video streaming and very low uplink usage. For these types of unbalanced data flow events, it may be beneficial for the UE 100 not to apply full beam correspondence. This may allow the UE 100 to reduce power consumption by turning off some beamforming elements of the antenna in the receive chain for higher uplink load than downlink load or turn off some beamforming elements of the antenna in the transmit chain for higher downlink load than uplink load. Therefore, in one embodiment, the triggering event (also referred to as a predetermined condition) for turning off beam correspondence may be an imbalance in uplink and downlink data load that is above a predetermined threshold. The imbalance may be measured in any appropriate way such as, but not limited to, a difference between the uplink and downlink loads, a difference between downlink and uplink loads, a ratio of uplink load to downlink load, and a ratio of downlink load to uplink load.

In another example, the signal to noise ratio (SNR) in the downlink path may be high enough that full antenna gain is not needed (e.g. when the UE 100 is close to the base station). In this case, the UE 100 may operate a single antenna instead of an array of antennas used for beam formation. When beam correspondence is turned on in the UE, the same antenna pattern is used for the receiver and the transmitter operations. But in the situation where the UE 100 is physically close to the TRP, power may be saved if the UE 100 turns off beam forming capability in receive mode (downlink) in favor of an omnidirectional-like antenna pattern since less current will be sent to the antenna. But beam forming may be maintained in the transmit mode (uplink) to enhance performance.

Another example is in the event that the UE is required to respond with the best polarization (possible definition C described in the background section). Depending on the implementation of the UE 100, full polarization control may not be possible throughout the total power range of the transmitter. Under this UE 100 architecture and a BC definitional requirement regarding use of best polarization, it is likely that the UE will not be able to maintain BC compliance in the complete cell of the TRP. In one embodiment, the UE 100 is provided with a signaling mechanism (e.g., a radio resource control (RRC) message) to inform the RAN node 110 that full BC compliance is not possible for this reason. In one embodiment, the UE 100 is required to respond to the RAN node 110 with a polarization defined by a communications standard under which the wireless communication device operates and polarization control by the UE 100 varies through a total power range of a transmitter of the wireless interface 122, and the predetermined condition is polarization control by the US 100 at a transmit power level to meet the polarization defined by a communications standard is not possible.

To accommodate these circumstances, or other circumstances where there may be benefits gained by not using BC, the UE 100 may have functionality to selectively disable BC and then resume BC when circumstances change. The disabling and enabling of BC is coordinated with the RAN node 110. When the UE 100 has beam correspondence in an on state (enabled), the RAN node 110 will assume that the DL and UL beams are identical. Thus, the RAN node 110 may control the TRP with appropriate beam search and power control settings, which are typically simplified relative to the case where the UE 100 does not operate with beam correspondence. Therefore, it is desirable that RAN node 110 be informed by the UE 100 as to the on or off state of beam correspondence applied by the UE 100.

Figure 4:
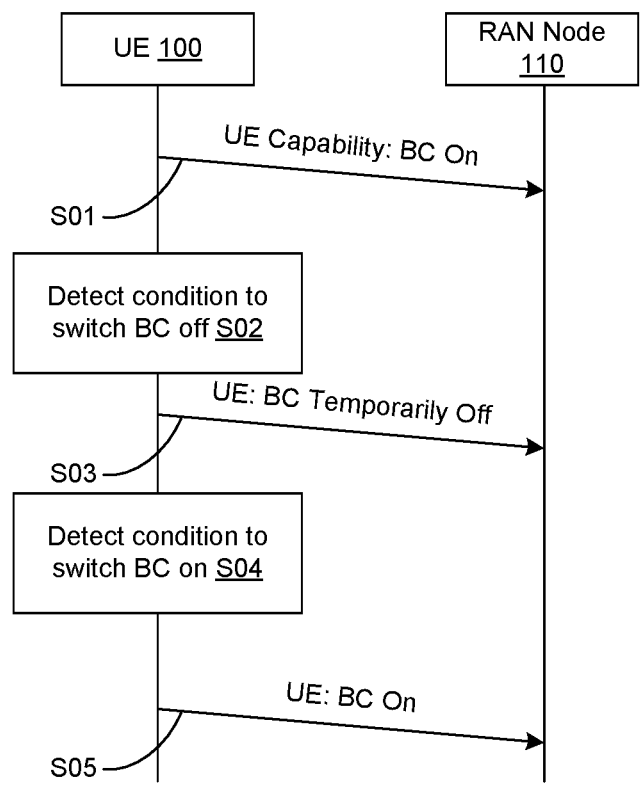
FIG. 4 is an exemplary message flow diagram for communications between the user equipment and the RAN node.

With additional reference to FIG. 4, shown is an exemplary signaling diagram for messages that are sent between the UE 100 and the RAN node 110 to manage BC operation. FIG. 4 may be considered to illustrate an exemplary process flow containing steps that may be collectively carried out by various components of the network 102. FIG. 4 also may be considered to illustrate exemplary process flows that each contain one or more steps carried out by respective individual components of the network 102. Although illustrated in a logical progression, the operations shown in FIG. 4 may be carried out in other orders and/or with concurrence between two or more operations. Therefore, the illustrated flow may be altered (including omitting steps) and/or may be implemented in other manners. The operations carried out by the various devices may be embodied in respective logical routines (e.g., software or lines of code) stored on non-transitory computer readable medium of the appropriate devices.

At step S01, the UE 100 may activate BC and adjust antenna operation accordingly. Also, the UE 100 may transmit a message to the RAN node 100 indicating that the UE 100 is operating in accordance with BC. The RAN node 100 may receive the message of step S01 and conduct beam search functions and power control on the basis that the UE's beams in uplink and downlink are identical.

Thereafter, in step S02, the UE 100 may detect a trigger condition for which BC operation is to be turned off. The trigger condition may be one of the exemplary situations described above or some other situation. In the case of proximity to the TRP, for example, distance may be approximated using downlink received signal strength indicator (RSSI) or path loss information based on measuring downlink signals. The approximated distance may be compared to a threshold value. If the approximated distance is less than the threshold value, then a positive determination may be made in S02. As another example, output power level based on polarization control may be compared to an upper and/or lower threshold value outside of which full polarization control is difficult to achieve. If the transmit power level is outside the range between the thresholds, then a positive determination may be made in S02.

Upon a positive result in step S02, the UE 100 may start to operate without beam correspondence between receive and transmit operations. Additionally, in step S03, the UE 10 may transmit a message to the RAN node 100 indicating that the UE 100 is not operating in accordance with BC.

The RAN node 100 may receive the message of step S03 and conduct beam search functions and power control on the basis that the UE's beams in uplink and downlink are not identical. For instance, beam selection may be independently made for the uplink and the downlink, and the TRP may be controlled using different power control loops for the uplink and the downlink.

In step S04, the UE 100 detects that the condition triggering a positive result in step S02 is no longer present or a new condition exists that allows for operation using BC. In this case, a positive result is made in block S04. Upon a positive determination in block S04, the UE 100 may activate BC and adjust antenna operation accordingly. Additionally, in step S05, the UE 10 may transmit a message to the RAN node 100 indicating that the UE 100 is operating in accordance with BC. The RAN node 100 may receive the message of step S05 and conduct beam search functions and power control on the basis that the UE's beams in uplink and downlink are operating in accordance with BC.

Disclosed above are techniques for a UE that declares BC, or operates under a specification where BC is mandatory, to temporarily turn BC off. Temporarily turning BC off allows the UE to have different beam patterns in the downlink and the uplink. One benefit of this operation is saving power while BC is off.

CONCLUSION

Although certain embodiments have been shown and described, it is understood that equivalents and modifications falling within the scope of the appended claims will occur to others who are skilled in the art upon the reading and understanding of this specification.

What is claimed is:

1. A wireless communication device, comprising:
   a wireless interface for conducting wireless communications with a network access node of a wireless network, the wireless interface having uplink and downlink beam forming capabilities; and
   a control circuit configured to:
   during operation of the wireless interface with beam correspondence between uplink and downlink operations, detect a predetermined condition and, in response to the detection, temporarily disable the beam correspondence so as to operate the wireless interface without beam correspondence between uplink and downlink operations; and
   transmit a message to the network access node that beam correspondence is not used by the wireless communication device.

2. The wireless communication device of claim 1, wherein the control circuit is further configured to detect that the predetermined condition is no longer present and, in response, activate beam correspondence and transmit a message to the network access node that beam correspondence is used by the wireless communication device.

3. The wireless communication device of claim 1, wherein the predetermined condition is an imbalance in uplink and downlink data load above a predetermined threshold.

4. The wireless communication device of claim 3, wherein the control circuit is further configured to reduce power consumption by the wireless interface by at least one of turning off some beamforming elements of an antenna in a receive chain for higher uplink load than downlink load or by turning off some beamforming elements of the antenna in a transmit chain for higher downlink load than uplink load.

5. The wireless communication device of claim 1, wherein the predetermined condition is a signal to noise ratio above a predetermined threshold.

6. The wireless communication device of claim 1, wherein the predetermined condition is a distance between the wireless communication device and the network access node is less than a predetermined threshold.

7. The wireless communication device of claim 6, wherein the distance is approximated by received signal strength indicator (RSSI) or path loss information.

8. The wireless communication device of claim 1, wherein the wireless communication device is required to respond to the network access device with a polarization defined by a communications standard under which the wireless communication device operates and polarization control by the wireless communication device varies through a total power range of a transmitter of the wireless interface, and the predetermined condition is polarization control by the wireless communication device at a transmit power level to meet the polarization defined by a communications standard is not possible.

9. The wireless communication device of claim 8, wherein determination that the predetermined condition is present is determined by comparing a transmit power level to an upper threshold value for which full polarization control is possible and a lower threshold value for which full polarization control is possible, and the transmit power level is outside a range between the thresholds.

10. A wireless network, comprising:
    the wireless communication device of claim 1; and
    a transmit/receive point (TRP) of the network access node having uplink and downlink beam forming capabilities relative to the wireless communication device, the TRP comprising a control circuit configured to control operation of the TRP, including:
    receive the message from the wireless communication device that beam correspondence is not used by the wireless communication device; and
    independently apply a first beam management process for the uplink with the wireless communication device and a second beam management process for the downlink with the wireless communication device.

11. A method of conducting wireless communications in a wireless network; comprising:
    operating a wireless interface having uplink and downlink beam forming capabilities of a wireless communication device with beam correspondence;
    during operation of the wireless interface with beam correspondence between uplink and downlink operations, detecting presence of a predetermined condition and, in response to the detecting, temporarily disabling the beam correspondence and operating the wireless interface without beam correspondence between uplink and downlink operations; and
    transmitting a message to a network access node of the wireless network that beam correspondence is not used by the wireless communication device.

12. The method of claim 11, further comprising detecting that the predetermined condition is no longer present and, in response, activating beam correspondence and transmitting a message to the network access node that beam correspondence is used by the wireless communication device.

13. The method of claim 11, wherein the predetermined condition is an imbalance in uplink and downlink data load above a predetermined threshold.

14. The method of claim 13, further comprising reducing power consumption by the wireless interface by at least one of turning off some beamforming elements of an antenna in a receive chain for higher uplink load than downlink load or turning off some beamforming elements of the antenna in a transmit chain for higher downlink load than uplink load.

15. The method of claim 11, wherein the predetermined condition is a signal to noise ratio above a predetermined threshold.

16. The method of claim 11, wherein the predetermined condition is a distance between the wireless communication device and the network access node is less than a predetermined threshold.

17. The method of claim 16, wherein the distance is approximated by received signal strength indicator (RSSI) or path loss information.

18. The method of claim 11, wherein the wireless communication device is required to respond to the network access device with a polarization defined by a communications standard under which the wireless communication device operates and polarization control by the wireless communication device varies through a total power range of a transmitter of the wireless interface, and the predetermined condition is polarization control by the wireless communication device at a transmit power level to meet the polarization defined by a communications standard is not possible.

19. The method of claim 18, wherein determination that the predetermined condition is present is determined by comparing a transmit power level to an upper threshold value for which full polarization control is possible and a lower threshold value for which full polarization control is possible, and the transmit power level is outside a range between the thresholds.

20. The method of claim 11, further comprising:
  operating a transmit/receive point (TRP) of the network access node, the TRP having uplink and downlink beam forming capabilities relative to the wireless communication device, the operating of the TRP carried out in accordance with beam correspondence for the wireless communication device;
  at the TRP, receiving a message from the wireless communication device that beam correspondence is not used by the wireless communication device; and
  in response the message and at the TRP, independently applying a first beam management process for the uplink with the wireless communication device and a second beam management process for the downlink with the wireless communication device.

* * * * *